US008637769B2

(12) United States Patent
Denndoerfer et al.

(10) Patent No.: US 8,637,769 B2
(45) Date of Patent: Jan. 28, 2014

(54) FIELD-CONTROLLED COMPOSITE INSULATOR AND METHOD FOR PRODUCING THE COMPOSITE INSULATOR

(75) Inventors: Heinz Denndoerfer, Selb (DE); Jens Seifert, Wunsiedel (DE); Volker Hinrichsen, Darmstadt (DE)

(73) Assignee: LAPP Insulators GmbH, Wunsiedel (DE)

( * ) Notice: Subject to any disclaimer, the term of this patent is extended or adjusted under 35 U.S.C. 154(b) by 186 days.

(21) Appl. No.: 12/856,806

(22) Filed: Aug. 16, 2010

(65) Prior Publication Data

US 2011/0017488 A1 Jan. 27, 2011

Related U.S. Application Data

(63) Continuation of application No. PCT/EP2009/000983, filed on Feb. 12, 2009.

(30) Foreign Application Priority Data

Feb. 14, 2008 (DE) ......................... 10 2008 009 333

(51) Int. Cl.
*H02G 15/00* (2006.01)

(52) U.S. Cl.
USPC ......................................................... 174/73.1

(58) Field of Classification Search
USPC ......................................................... 174/73.1
See application file for complete search history.

(56) References Cited

U.S. PATENT DOCUMENTS 3,325,584 A 6/1967 Herzig
5,206,780 A * 4/1993 Varreng ........................ 361/117
6,534,721 B2 3/2003 Hoefner
6,864,432 B2 3/2005 Boettcher et al.
7,170,004 B2 * 1/2007 Gramespacher et al. .... 174/73.1
7,262,367 B2 8/2007 Donzel et al.
2010/0032188 A1 2/2010 Meier et al.
2010/0288527 A1 * 11/2010 Lichy ........................... 174/73.1

FOREIGN PATENT DOCUMENTS

DE 1515467 A1 11/1969
DE 2006247 A1 10/1971
DE 2905150 A1 10/1979
DE 3214141 A1 10/1983

(Continued)

OTHER PUBLICATIONS

International Search Report dated Jun. 8, 2009.

*Primary Examiner* — Chau Nguyen

(74) *Attorney, Agent, or Firm* — Laurence A. Greenberg; Werner H. Stemer; Ralph E. Locher

(57) ABSTRACT

A field-controlled composite insulator uses materials which are greatly stressed by an inhomogeneous distribution of an electrical field across a surface thereof. One of the causes thereof is the structural configuration of the insulator. The field strength changes particularly in a region of fittings due to a transition from insulating materials of sheds and an insulator core to a metal material, due to a transition from ground potential at cross members or to a conductor potential at that location, where conductor cables are attached. A further cause is deposits of dirt, which stress an insulator overall. A field control layer is therefore disposed between the core and the protective layer in at least one section of the insulator. The control layer includes particles as a filler, which influence the electrical field of the insulator. A method for producing the composite insulator is also provided.

18 Claims, 6 Drawing Sheets

(56) References Cited

FOREIGN PATENT DOCUMENTS

| | | | |
|---|---|---|---|
| DE | 19700387 | A1 | 7/1997 |
| DE | 19856123 | A1 | 7/2000 |
| DE | 102005041167 | A1 | 3/2007 |
| EP | 1147525 | B1 | 4/2005 |
| EP | 1577904 | A1 | 9/2005 |
| EP | 1936638 | A1 | 6/2008 |
| GB | 1334164 | A | 10/1973 |
| GB | 2022328 | A | 12/1979 |
| WO | 9836424 | A1 | 8/1998 |
| WO | 02065486 | A1 | 8/2002 |

* cited by examiner

FIELD-CONTROLLED COMPOSITE INSULATOR AND METHOD FOR PRODUCING THE COMPOSITE INSULATOR

CROSS-REFERENCE TO RELATED APPLICATION

This is a continuation, under 35 U.S.C. §120, of copending International Application No. PCT/EP2009/000983, filed Feb. 12, 2009, which designated the United States; this application also claims the priority, under 35 U.S.C. §119, of German Patent Application DE 10 2008 009 333.5, filed Feb. 14, 2008; the prior applications are herewith incorporated by reference in their entirety.

BACKGROUND OF THE INVENTION

Field of the Invention

The invention relates to a field-controlled composite insulator, containing a rod or tube as an insulator core composed of fiber-reinforced plastic, which is covered with a shed sleeve and has fittings fitted at its ends. The invention also relates to a method for producing the composite insulator.

The materials of an insulator are severely loaded by an inhomogeneous distribution of an electrical field over its surface. One of the reasons is the structural configuration of an insulator. Particularly in the area of the fittings, the field strength varies because of the transition from the insulating materials of the sheds and of the insulator core to a metallic material, because of the transition to the ground potential on the mast, tower or pole cross member and to the conductor potential, where the conductor cables are attached. In order to prevent a local field disturbance caused thereby, in particular field strength peaks, it is possible to use so-called geometric field control. The geometry of the workpieces, in particular live parts, is smoothed out by rounding corners and edges.

A further reason is dirt deposits, which are a load that affects an insulator overall. Over time, thin dirt layers are deposited on composite insulators which, as outdoor installations, are subject to the weather. Due to the electrical conductivity of those layers, charging currents can flow on the insulator surfaces. If those layers become wet, for example as a result of rain or dew, the conductivity is increased even further, leading to increased current levels of leakage and discharge currents, and to resistive losses. That results in heating of the dirt layers, as a consequence of which they dry out. The drying-out dirt layers locally have a high impedance, as a result of which high voltage drops can occur in that case. If that results in electrical breakdown strength of the surrounding air being exceeded, corona discharges occur, or electrical flashover discharges, which cause ageing, and finally destruction, of the material of the insulator surface. Local coverings or coatings of insulating materials, for example plastics such as epoxy resins and polymers, with additives composed of dielectric and/or ferroelectrical substances, are applied as field control layers, as measures to unify the electrical field and to avoid local field disturbance, in particular field strength peaks.

It is known from an exemplary embodiment of a high-voltage composite insulator according to German Published, Non-Prosecuted Patent Application DE 32 14 141 A1 (see FIG. 2 thereof) that a multiplicity of sheds with a collar pushed over the core and with a contact sleeve between the last shed and the metal fitting, are semiconductive. In that embodiment of an insulator, there is a risk of metal particles and other dirt particles in the air being deposited directly on the electrically semiconductive layer, from where—as a result of electrical interactions—it is difficult to wash them away, because of natural weathering. With appropriate geometry, those particles can lead to local field strength peaks, and thus to damage to the insulator.

German Patent DE 197 00 387 B4 discloses a composite insulator, the shed element and, if appropriate, the core of which are each manufactured from a semiconductive material. The semiconductor capability of the shed sleeve and of the core are of the same magnitude at every point on the insulator. Due to weathering influences and dirt, the shed sleeve must additionally be coated with a protective layer.

Furthermore, European Application EP 1 577 904 A1, corresponding to U.S. Pat. No. 7,262,367, proposes a composite insulator, in which a field control layer is disposed in at least one section between the core and the protective layer and contains particles, as a filler, which influence the electrical field of the insulator. A composite insulator such as that is also disclosed in German Published, Non-Prosecuted Patent Application DE 15 15 467 A1, corresponding to U.S. Pat. No. 3,325,584.

SUMMARY OF THE INVENTION

It is accordingly an object of the invention to provide a field-controlled composite insulator and a method for producing the composite insulator, which overcome the hereinafore-mentioned disadvantages of the heretofore-known devices and methods of this general type and in which the reasons for formation of local field disturbances, in particular field strength peaks and corona discharges, are very largely overcome by a field control layer which is matched to the respective disturbance.

With the foregoing and other objects in view there is provided, in accordance with the invention, a composite insulator, comprising a core, a protective layer surrounding the core, and a field control layer disposed between the core and the protective layer in at least one section of the insulator. The field control layer has a stratum with a length, and the field control layer contains a proportion of particles, as a filler, influencing an electrical field of the insulator. The proportion of the particles influencing the electrical field differs over the length of the stratum.

With the objects of the invention in view, there is also provided a method for producing a composite insulator. The method comprises providing a core, providing a protective layer surrounding the core, providing a field control layer including at least one stratum of an elastomer material having particles influencing an electrical field of the insulator in a particle proportion differing over a length of the stratum, applying the field control layer to the core in at least one section of the insulator, entirely coating the core with the applied field control layer having the protective layer, and then subjecting the insulator to a heat treatment to vulcanize plastics.

The field control layer of the composite insulator according to the invention accordingly has a stratum wherein the proportion of the particles which influence the electrical field differs over the length of the stratum.

The conductive contact between the field control layer and the fitting can be produced, for example, by a conductive lacquer, metal rings or wire mesh. Outside the fitting, the field control layer is surrounded by a protective layer, or directly by sheds which are extruded seamlessly onto the core. The insulator core, as a tube or rod, generally is formed of thermoset material, such as epoxy resin or polyester resin, reinforced with glass fibers.

The invention is suitable for all types of composite insulators, in particular for hanging insulators, post insulators or bushing insulators. The field of use starts at high voltages above 1 kV, and is particularly effective at voltages above 72.5 kV.

The field control layer is generally composed of the same material as the protective layer covering it. However, the protective layer can also advantageously be composed of a material which is more resistant to erosion and creepage current. In any case, the protective layer is composed of a material having good insulation characteristics. Materials having these characteristics are elastomer materials, for example polymer plastics such as silicone rubber (HTV) of hardness classes Shore A 60 to 90, or ethylene-propylene copolymer (EPM). The sheds are pushed onto the core prepared in this way, with a field control layer and protective layer, and the sheds may be composed of the same material as the protective layer. The protective layer and the sheds can also be extruded onto the core from the same material in one and the same process, as is known from European Patent 1 147 525 B1.

The field can be controlled resistively or capacitively, or by a combination of the two together. For this purpose, the material of the field control layer is filled with particles, as a filler, which control the field.

A field control layer is provided with resistive conductive and/or semiconductive fillers for resistive field control. The linear material relationship between voltage and current is used in the resistive conductive fillers. The conductive fillers include, for example, carbon black, $Fe_3O_4$ and other metal oxides.

Semiconductive materials exist which have a non-linear relationship between the voltage and current. Varistors, for example, ZnO, have these characteristics and become conductive above a defined voltage or field strength, and therefore have the capability to limit overvoltages. Microvaristors are particularly suitable for resistive field control. These are varistors in powder form with grain diameters of between 50 nm and 100 μm. When suitably constructed, a material filled with microvaristors, in particular a silicone material, can achieve a high electrical conductivity when loaded with surge voltages, while creating little power loss during continuous operation.

Materials with dielectric characteristics such as $TiO_2$, $BaTiO_3$ or TiOx are used for capacitive field control. These materials have a high dielectric constant (permittivity).

Refractive field control is a special form of capacitive field control. The lines of force are interrupted at the junctions between the materials by a suitable configuration of materials with dielectric constants of different magnitude, in such a way that local field disturbances, in particular field strength peaks, are overcome as much as possible.

In accordance with another feature of the invention, the field control layer may be formed of one stratum or a plurality of strata, in which case the individual strata may have different field control characteristics.

In accordance with a further feature of the invention, the particles which are added as fillers to the strata of the field control layer have a diameter of 10 nm to 100 μm, preferably in a range from 0.1 μM to 10 μm. Their size is governed by the thickness of the stratum and the intensity and the extent of the field disturbance to be expected.

In accordance with an added feature of the invention, the proportion of particles is between 50 and 90% by weight, advantageously 70%.

In accordance with an additional feature of the invention, the proportion of the particles, of the filling level, may be above the percolation limit, that is to say the particles make direct electrical contact.

In accordance with yet another feature of the invention, the thickness of a stratum of a field control layer may be 1 mm to 5 mm, generally 2 mm to 3 mm. This is governed by the intensity and the extent of the field disturbance to be expected.

In accordance with yet a further feature of the invention, the field control layer may be formed of one stratum and may contain exclusively resistive particles as a filler. A layer such as this is provided at those points on the insulator where resistive field control is preferably required.

In accordance with yet an added feature of the invention, the field control layer may be formed of one stratum and may contain exclusively capacitive particles as a filler. A layer such as this is provided at those points on the insulator where capacitive, or specifically refractive, field control is preferably required.

In accordance with yet an additional feature of the invention, the field control layer may be formed of one stratum, and the proportion of the resistive or capacitive particles may differ over the length of the stratum. The intensity of the effect on the field disturbances can be varied locally, with the same thickness, by varying the proportion of fillers in the stratum. The proportion of the filler can be varied if the filler has not already been mixed to the material of the stratum before application, but is added to the material only in or before the nozzle for application of the stratum.

In accordance with still another feature of the invention, the thickness of a stratum of a field control layer may vary over its length. This can be done by varying the feed rate within the extruder which applies the stratum to the core.

In accordance with still a further feature of the invention, the field control layer may also be formed of at least two strata with resistive or capacitive particles as fillers. In this case, one stratum may have a higher proportion of resistive or capacitive particles than the other stratum.

In accordance with still an added feature of the invention, the field control layer may also be formed of at least two strata, with one stratum containing exclusively resistive particles, and another stratum containing exclusively capacitive particles. When there are a plurality of strata one above the other, the strata may alternate in their sequence.

In accordance with still an additional feature of the invention, the field control layer may be formed of one stratum, and may contain a mixture of resistive and capacitive particles.

In accordance with again another feature of the invention, the field control layer may also be formed of at least two strata, with one stratum containing a mixture of resistive and capacitive particles, and the other stratum containing exclusively resistive or capacitive particles.

In accordance with again a further feature of the invention, when there are a plurality of strata one above the other, the strata may alternate in their sequence and/or composition with respect to their effect on the electrical field. In addition, the proportion of the capacitive and/or resistive particles in the individual strata of the layer may be different.

In accordance with again an added feature of the invention, the field control layer may be applied over the entire length of the insulator core. However, it may also extend only over subareas, for example in the area of the fittings. The field control layer may also be subdivided into individual sections, and therefore interrupted.

In accordance with again an additional feature of the invention, in the situation in which the field control layer is subdivided into individual sections and is formed of at least two strata, one stratum in the boundary area to the layer-free section may be longer than the other and extend beyond the stratum located above or below it, to the layer-free section, as a result of which the field-influencing character of this stratum is exclusively effective.

The discontinuous configurations of the layer as described above make it possible to avoid high power losses.

In accordance with yet another feature of the invention, the individual strata of a field control layer may, if required, be separated from one another by insulating intermediate strata, when differences in the conductivity in the contact area of the two strata could themselves lead to undesirable changes in the field.

The combination of options as stated above regarding the number of strata, the configuration of the individual strata within a layer and the degree of filling with capacitive and/or resistive particles makes it possible, at the possible points where an inhomogeneity in the electrical field which would be damaging to the insulator can occur, for this to be prevented and to be suppressed by a layer matched thereto.

In accordance with yet a further feature of the invention, microvaristors, in particular ZnO, are preferred for resistive field control.

In accordance with yet an added feature of the invention, in order to protect the field control layer, this layer can be covered with a protective layer, for example an insulating HTV-silicone extrudate layer with extremely good creepage-current, erosion and weather resistances, onto which the sheds are then pushed. This protective layer improves the open-air resistance and may be up to 5 mm thick, advantageously between 2 mm and 3 mm.

However, sheds can also be extruded directly onto the core with the field control layer, without any gaps, as is known from European Patent 1 147 525 B1. The protective layer and sheds are then composed of the same material.

The field control layer can be applied to the core by an extruder through which the core is pushed. If the intention is to apply a layer with a plurality of strata on the core, then this can be done through a multistage nozzle or through a plurality of extruders disposed one behind the other. The strata must be applied in such a way that they adhere well to the insulator core and are connected to one another to form a layer. It may be necessary to apply adhesion promoters.

The invention offers the capability to use a field control layer only at those points at which critical disturbances in the electrical field, in particular field strength peaks, can occur. This makes it possible to reduce the power losses on the insulators to minimal values.

The composition of the field control layer with strata with resistive and/or capacitive particles or the formation of the layer from two or more strata, in particular with different particles and/or particle proportions, as well as the variation of the coverage lengths of the strata can advantageously be matched to the field disturbances to be overcome, in particular field strength peaks, caused in particular by local dirt. This unifies the field distribution along the insulator. This prevents the creation of corona discharges and flashovers, thus preventing premature ageing of the material.

Other features which are considered as characteristic for the invention are set forth in the appended claims.

Although the invention is illustrated and described herein as embodied in a field-controlled composite insulator and a method for producing the composite insulator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
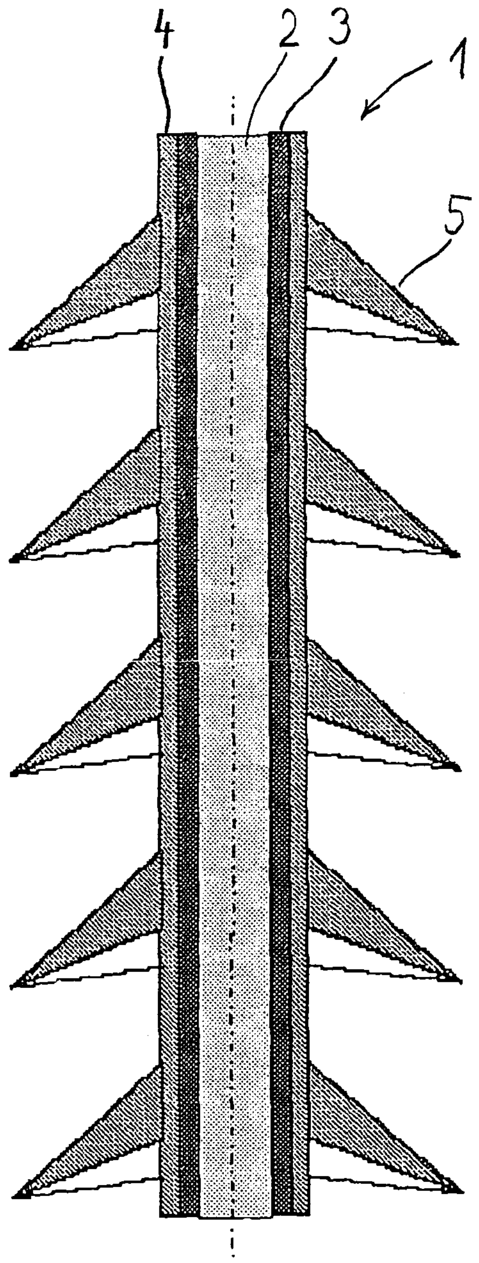
FIG. 1 is a fragmentary, diagrammatic, longitudinal-sectional view of a composite insulator with a field control layer formed of one stratum.

Referring now to the figures of the drawings in detail and first, particularly, to FIG. 1 thereof, there is seen a longitudinal section through a composite insulator 1, in which a portion of a long rod insulator is shown. A field control layer 3 is applied to a core 2 composed of glass-fiber-reinforced plastic. The field control layer 3 may have capacitive or resistive characteristics, in order to match the field disturbances which occur. For example, it may contain microvaristors composed of ZnO for resistive field control. The field control layer 3 is covered by a protective layer 4 which is formed of a material that is resistant to erosion and creepage currents, and which protects the field control layer 3 against weather influences and dirt. Sheds 5 are disposed at regular intervals on this protective layer 4 and are molded from one of the known polymer plastics.

Figure 2:
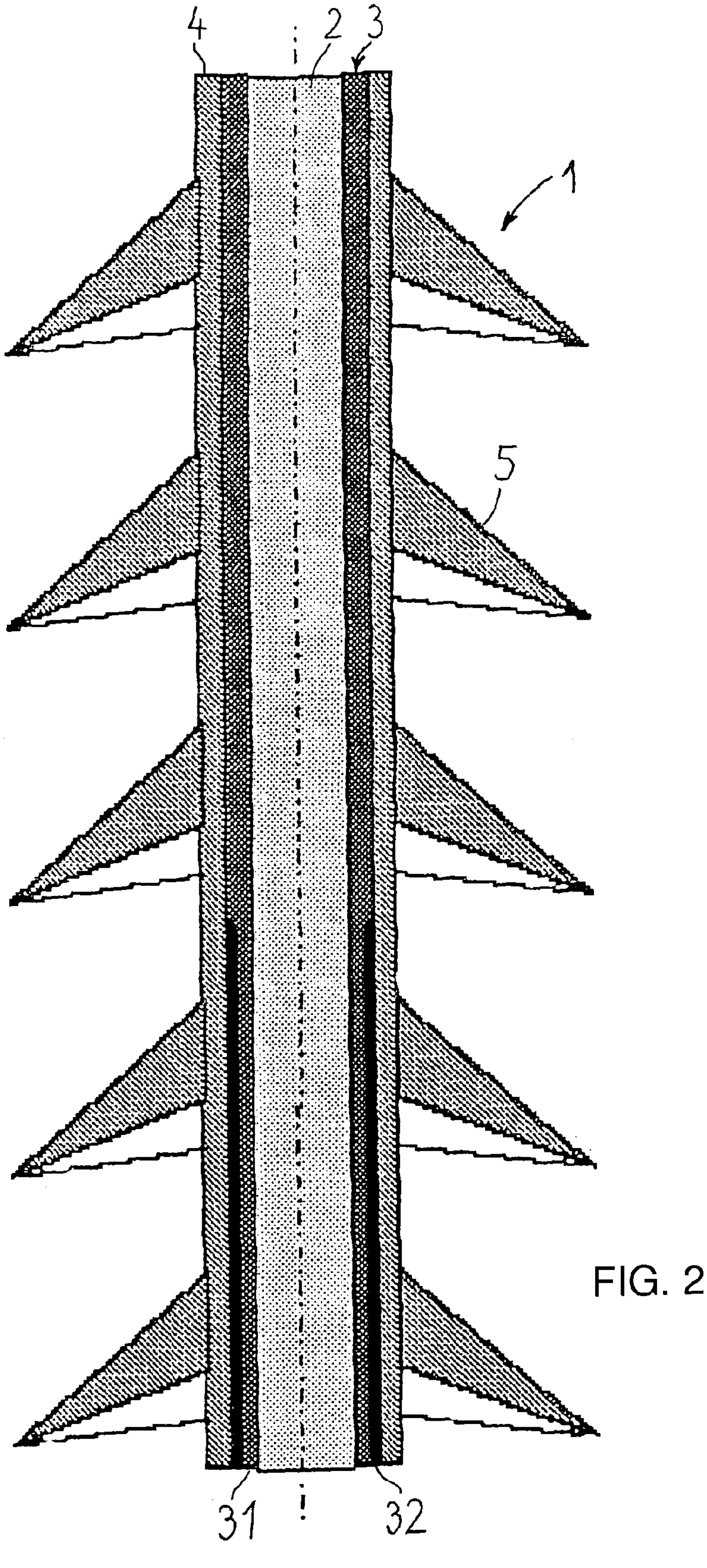
FIG. 2 is a fragmentary, longitudinal-sectional view of a composite insulator with a field control layer formed of two strata, in which one stratum covers only a part of the core.

FIG. 2 likewise shows a longitudinal section through a composite insulator 1. Features which correspond to those in FIG. 1 are annotated with the same reference numerals. In the present exemplary embodiment, the field control layer 3 in one subarea of the insulator 1 is formed of two strata 31 and 32, of which the stratum 32 is disposed above the continuous stratum 31. The two strata 31 and 32 may have different field control characteristics. For example, the outer stratum 32 may have capacitive characteristics, and the continuous stratum 31 may have resistive characteristics. A configuration of layers such as this may be advantageous, for example, in an area of fittings, with respect to field disturbances caused by the structure. In the present exemplary embodiment, the field control layer 3 has a continuous uniform thickness. In the area in which the field control layer 3 has two strata, the inner stratum 31 can be applied more thinly by reducing extrusion. In a second process step, the outer stratum 32 can thus be applied sufficiently thickly to achieve a continuously uniform layer thickness.

Figure 3:
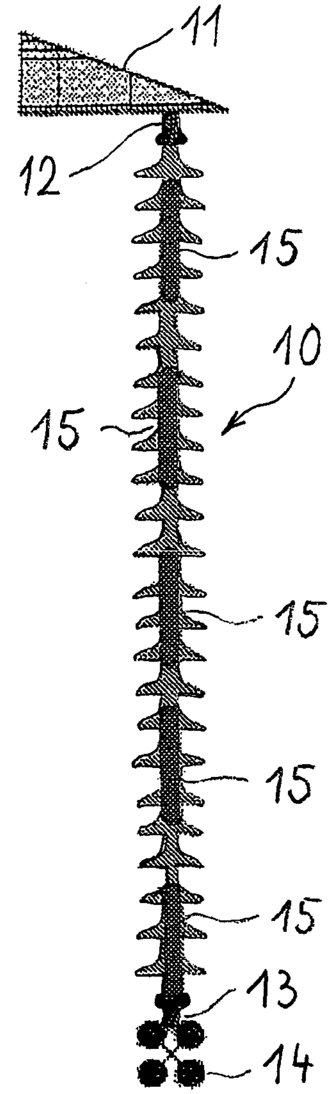
FIG. 3 is a fragmentary, longitudinal-sectional view of a long rod insulator, identifying those areas in which a field control layer is applied.
Figure 4:
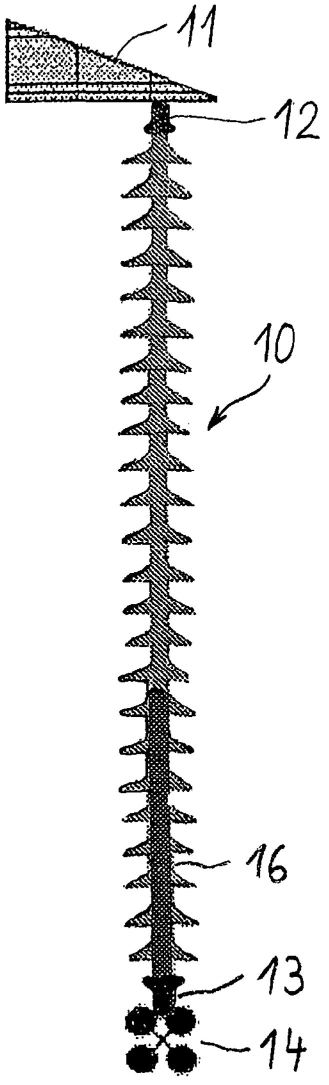
FIG. 4 is a fragmentary, longitudinal-sectional view of a long rod insulator, in which a field control layer is applied in the area of a fitting to which conductor cables are attached.

FIGS. 3 and 4 show long rod insulators 10 such as those used for high-voltage overhead lines. The structure of the field control layers of these insulators may, for example, correspond to the structure as described for the insulators illustrated in FIGS. 1 and 2. The insulators 10 are each suspended on a cross member 11 of a high-voltage mast, tower or pole, which is not illustrated herein. The insulators 10 are attached in a known manner to a fitting 12 composed of metal. Conductor cables 14 are attached to a lower end through the use of a further fitting 13. In the present exemplary embodiments, the insulators 10, which have a length of 4 m, are covered with a field control layer either only in sections, as is illustrated in FIG. 3, or only in a specific area on a fitting, as is illustrated in FIG. 4, in order to avoid excessively high power losses. The insulator 10 in FIG. 3 in each case has five areas 15 of equal size, in which the core is covered with a field control layer. These are each interrupted by areas of equal size without a field control layer. The insulator 10 in FIG. 4 has an area 16 which is covered with a field control layer and which extends from the fitting 13, to which the conductor cables 14 are attached, upwards over a third of the rod length.

Figure 5:
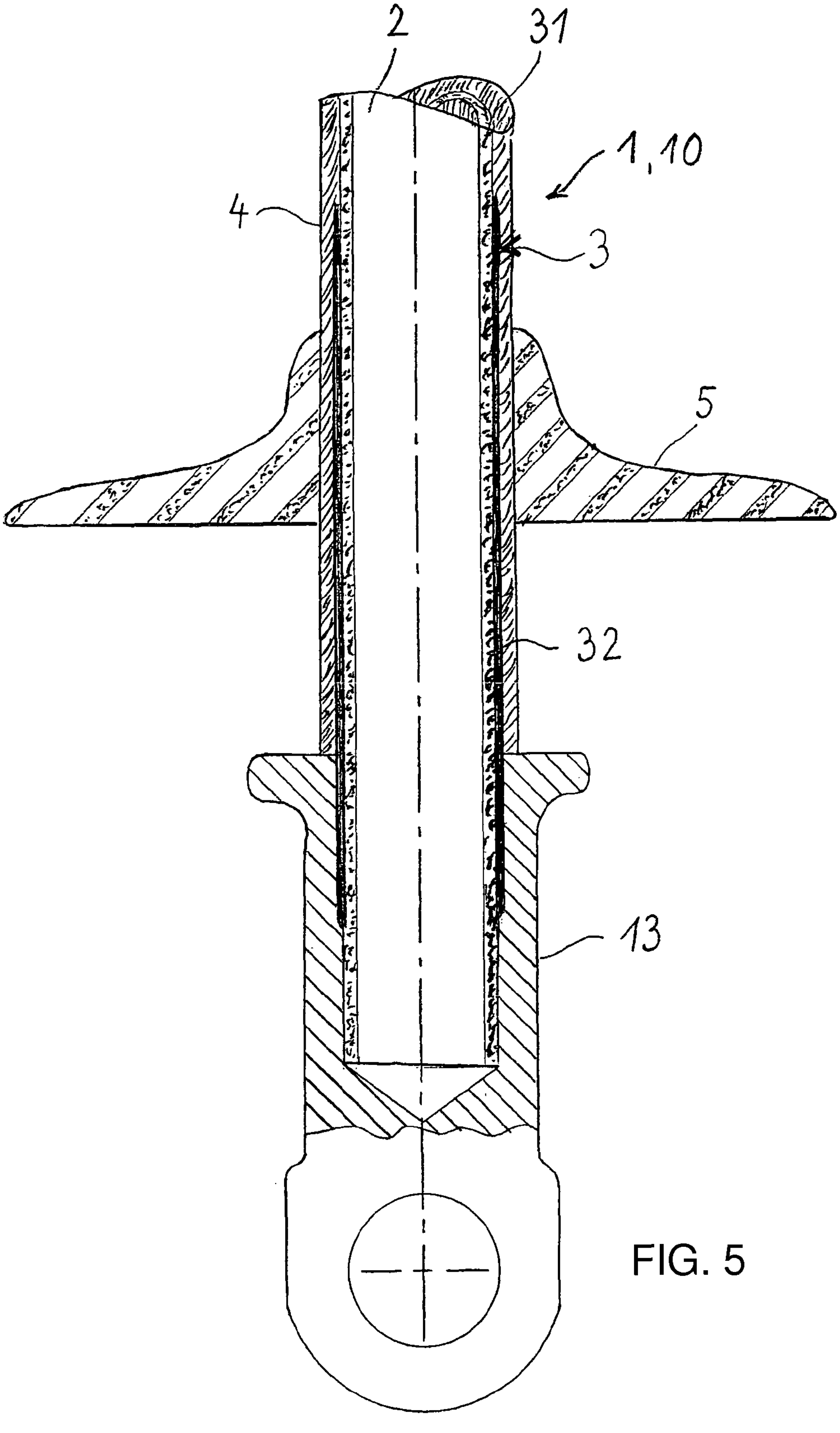
FIG. 5 is a fragmentary, partly broken-away, longitudinal-sectional view of a junction area between an insulator core and a fitting.

FIG. 5 shows a diagrammatic illustration of a junction area between a fitting and a shed sleeve area, in the form of a longitudinal section. The figure is a section through the end of an insulator with a fitting, to which the conductor cables are attached, as is illustrated in FIG. 3 or 4. Corresponding features to those in FIGS. 2, 3 and 4 are annotated with the same reference numerals.

In the insulator 1 or 10, the core 2 is formed of a rod composed of glass-fiber-reinforced plastic, which is covered with a field control layer 3 that in turn is sheathed by a protective layer 4. The sheds 5 are pulled onto this protective layer 4. The structure of the field control layer 3 corresponds to that illustrated in FIG. 2. The end of the rod 2 is surrounded by the fitting 13. A stratum 31 completely covers the core 2 of the insulator over the length which is visible in the illustration. The stratum 31 has a resistive effect and contains microvaristors. A stratum 32 with a capacitive effect, which contains fillers with dielectric characteristics, is located above the stratum 31 on the outside. The stratum 32 extends from the interior of the fitting 13 to above the first shed 5. The capacitive field control is particularly suitable for dissipating field strength peaks which are caused by the structure, for example by edges or stepped junctions, such as those which occur at the junction between a fitting and the insulator rod. In order to improve the conductive contact between the strata and the fitting, a cavity in the fitting, which surrounds the core, can be covered with a conductive lacquer. Although not illustrated herein, inserts of wire loops or wire meshes are also possible.

Figure 6:
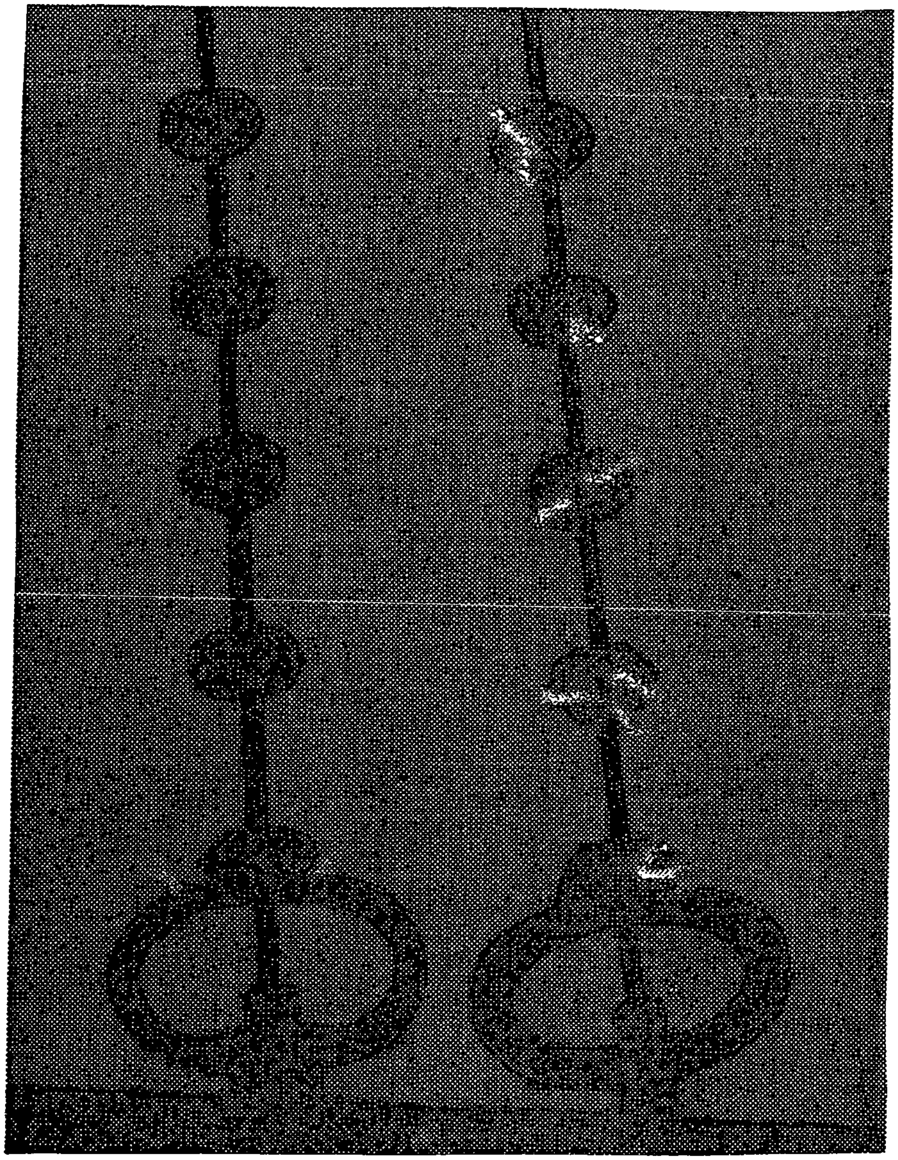
FIG. 6 is an illustration of a comparison test between an insulator with a field control layer and a conventional insulator when an AC voltage is applied, during rainfall.

FIG. 6 shows the result of a comparative test between a long rod insulator, having a surface which was covered with a field control layer corresponding to FIG. 1, and a conventional long rod insulator as a reference insulator, which was equipped exclusively with HTV silicone without a field control layer. The sheds were each composed of HTV silicone. The flashover distance was 2765 mm. In both samples, a 3 mm-thick polymer layer (cross-sectional area: 1.8 $cm^2$) was applied to a GFC rod with a diameter of 16 mm. In one of the samples, the polymer layer for field control had microvaristors, ZnO varistors in powder form, added in a proportion of 50 to 90% by weight, preferably 70% by weight, with a grain size of 10 nm to 100 μm, preferably between 0.1 μM and 10 μm. In the present exemplary embodiment, the filling level of the microvaristors was above the percolation limit, that is to say the microvaristors made direct electrical contact with one another.

In FIG. 6, the insulator with a field control layer can be seen on the left, and the reference insulator can be seen on the right, during the comparative test. Rain was applied to the insulators with an AC voltage of 750 kV (rms) applied to them. While the reference insulator under the lowest five sheds facing the conductor side exhibited strong discharge activities, the insulator equipped with the field control layer was completely discharge-free.

Figure 7:
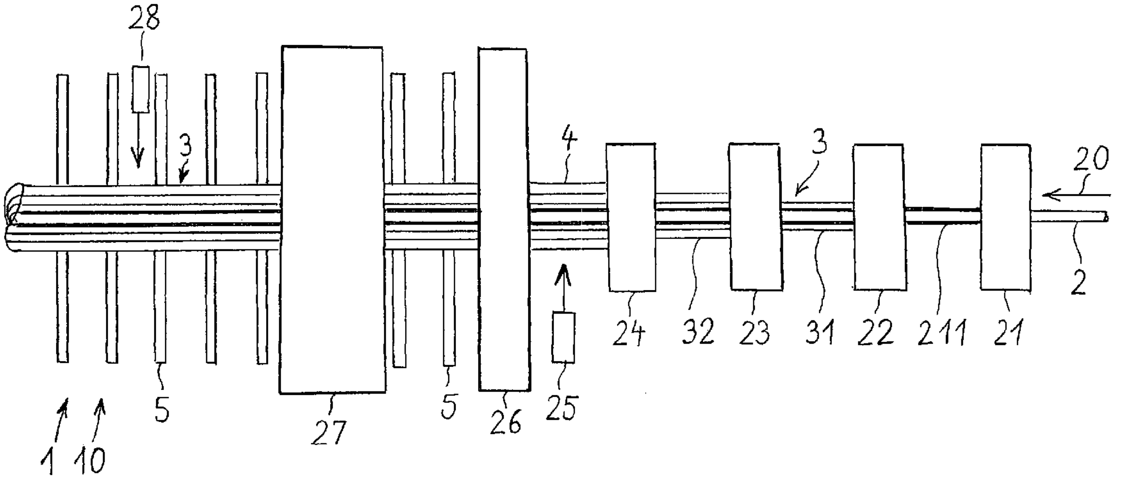
FIG. 7 is a flowchart used to explain the production of an insulator.

FIG. 7 shows a flowchart in order to explain the production of an insulator. The core 2 of the insulator to be produced is a rod which is composed of a glass-fiber-reinforced plastic. This rod of the core 2 is passed in a feed direction 20 through successively disposed stations where it is completed to form the insulator. An adhesion promoter 211 is applied in a first station 21, in order to closely connect the strata of the field control layer 3, which are to be applied subsequently, to the core 2. A first stratum 31 of the field control layer is applied in an extruder 22. The first stratum 31 is, for example, a stratum with varistors, that is a stratum with resistive character. If a further stratum is intended to follow, a further extruder 23 is provided for application of the further stratum 32, for example a stratum with a capacitive character. Instead of two extruders disposed one behind the other, it is also possible to use a two-nozzle extruder, which extrudes the two strata one on top of the other onto the rod. A following extruder 24 applies the protective layer 4.

The insulator core can now be separated by a separating tool 25, depending on the method used to produce the shed sleeve. In a following step 26, the sheds can be extruded on, or already prefabricated sheds 5 can be pushed on. Heat treatment 27 in order to cure the field control layer, the protective layer and the sheds, completes the production of the insulator 1 or 10. After preparation of the ends of the rod, the fittings can be attached thereto.

If the protective layer and the shed sleeve are applied to the insulator core 2 as a common layer in one and the same process, the production takes place in the station 26, corresponding to European Patent 1 147 525 B1. In this case, the individual, completed insulators 1 or 10 are only separated by a separating tool 28 after the heat treatment 27.

The invention claimed is:

1. A composite insulator, comprising:

a core;

a protective layer surrounding said core; and a field control layer disposed between said core and said protective layer in at least one section of the insulator, said field control layer having a stratum with a length, and said field control layer containing particles, as a filler, influencing an electrical field of the insulator;

said stratum containing a proportion of said particles influencing the electrical field, said proportion differing over said length of said stratum.

2. The composite insulator according to claim 1, wherein said stratum is one of two or more individual strata of said field control layer, and said individual strata have different field control characteristics.

3. The composite insulator according to claim 1, wherein said field control layer contains exclusively resistive or capacitive particles as said filler.

4. The composite insulator according to claim 1, wherein said stratum is one of at least two strata of said field control layer, and one of said strata has a higher proportion of resistive or capacitive particles than the other of said strata.

5. The composite insulator according to claim 1, wherein said stratum is one of at least two strata of said field control layer, one of said strata contains exclusively resistive particles, and the other of said strata contains exclusively capacitive particles.

6. The composite insulator according to claim 1, wherein said particles contain a mixture of resistive and capacitive particles.

7. The composite insulator according to claim 1, wherein said stratum is one of at least two strata of said field control layer, one stratum contains a mixture of resistive or capacitive particles, and the other stratum contains exclusively resistive or capacitive particles.

8. The composite insulator according to claim 1, wherein said stratum is one of a plurality of strata of said field control layer alternating one on top of the other in their sequence and/or composition with respect to their effect on the electrical field.

9. The composite insulator according to claim 1, wherein said stratum is one of a plurality of individual strata of said field control layer, said particles are capacitive and/or resistive particles, and said proportion of said capacitive and/or resistive particles is different in said individual strata.

10. The composite insulator according to claim 1, wherein said field control layer is applied in individual sections over a length of said core.

11. The composite insulator according to claim 1, wherein:

said stratum is one of a plurality of individual strata of said field control layer, and the composite insulator further comprises a stratum composed of an insulating material separating said individual strata from one another.

12. The composite insulator according to claim 1, wherein said proportion of said particles is between 50 and 90 percent by weight.

13. The composite insulator according to claim 12, wherein said proportion of said particles in said stratum is 70 percent by weight.

14. The composite insulator according to claim 12, wherein said proportion of said particles has a filling level above a percolation limit.

15. A method for producing a composite insulator, the method comprising the following steps:

providing a core;

providing a protective layer surrounding the core;

providing a field control layer including at least one stratum of an elastomer material having particles influencing an electrical field of the insulator in a particle proportion differing over a length of the stratum;

applying the field control layer to the core in at least one section of the insulator;

entirely coating the core having the applied field control layer, with the protective layer; and then subjecting the insulator to a heat treatment to vulcanize plastics.

16. The method according to claim 15, which further comprises providing the at least one stratum as at least two strata having different effects on the electrical field, and applying the field control layer having the at least two strata.

17. The method according to claim 15, which further comprises applying the field control layer to the core in the at least one section.

18. The method according to claim 15, which further comprises adding the particles influencing the electrical field of the insulator to an extrudate in a different amount, during an application of the stratum of the field control layer to the core.

* * * * *